June 23, 1970  G. F. WILLIAMS ET AL  3,516,691
FLUID SYSTEM CONNECTION ASSEMBLY OF FLEXIBLE
TUBE MEANS TO SOLID UNIT MEANS
Filed June 20, 1968  2 Sheets-Sheet 1

INVENTOR.
GEORGE F. WILLIAMS
HOEL L. BOWDITCH
BY
Lawrence H. Poeton
AGENT

*INVENTOR.*
GEORGE F WILLIAMS
HOEL L. BOWDITCH
BY
Lawrence H. Poston
AGENT

United States Patent Office 3,516,691
Patented June 23, 1970

3,516,691
FLUID SYSTEM CONNECTION ASSEMBLY OF FLEXIBLE TUBE MEANS TO SOLID UNIT MEANS
George F. Williams, Riverside, R.I., and Hoel L. Bowditch, Foxboro, Mass., assignors to The Foxboro Company, Foxboro, Mass., a corporation of Massachusetts
Filed June 20, 1968, Ser. No. 738,639
Int. Cl. F16l 33/22, 39/02
U.S. Cl. 285—137                                    1 Claim

ABSTRACT OF THE DISCLOSURE

In fluid instrumentation, a fluid connection assembly between a flexible tube and a solid unit boss by means of a squeeze plate around the tube, this assembly lending itself especially to harness assemblies of multiple tube systems, on a separable but usually permanent basis. A further combination is a permanent assembly according to this invention, wherein the solid unit is readily separably mounted with respect to another solid unit, in separable continuance of fluid pasages through the flexible tubes and through the first solid unit into the second solid unit; providing the advantage of solid unit to solid unit assembly in situations involving the interface between flexible tubings and passages in solid units.

---

This invention relates to fluid instrumentation systems in the exercise of process and energy control. It is particularly concerned with means for transporting operating fluids, such as air, between fixed solid units of such systems when units are spaced from each other.

Fluid transportation of this nature is often usefully accomplished by the use of flexible tube conduits, usually plastic tubes. In the end connection of such tubes, singly or in harness groups, to solid units of instrumentation, ordinary connection means can be slow, and can ivolve expensive and complex structures due to the necessity for dependable, fluid tight connections.

This invention provides new and useful means for connecting such flexible tubes to such fixed instrument units. This is accomplished by providing connection bosses on the fixed unit without the more expensive side protuberances often used to help secure such tubes. In this invention, a slight outward taper may be used on such bosses, in straight line outer boss wall taper to smaller diameter or cross section dimension at the outer end of the boss.

This invention further provides a new and useful combination, wherein a group of such flexible tubes, a harness, is secured to an instrument unit in a separable but usually permanent structure, whle at the same time making the fluid lines readily separable by providing the instrument unit with means for simple and direct connection, in addition to the harness connection, to a second instrumet unit, in abutment therewith, with no such flexible tubes between the two units.

Other objects and advantages of this invention will be in part apparent and in part pointed out hereinafter and in the accompanying drawings, wherein.

Figure 1:
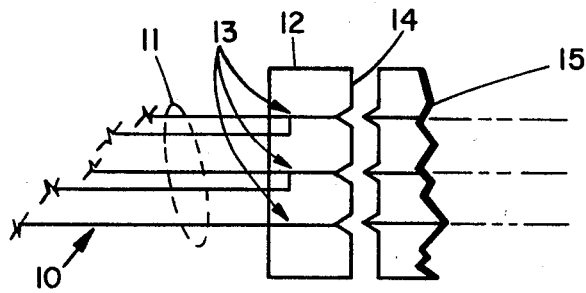
FIG. 1 is a schematic of an application of a connection assembly according to this invention.
Figure 4:
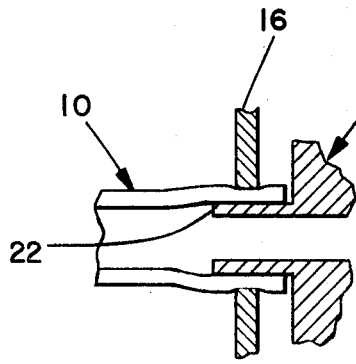
FIG. 4 is a fragment of the structure of FIGS. 2 and 3 showing an individual tube assembly.
Figure 5:
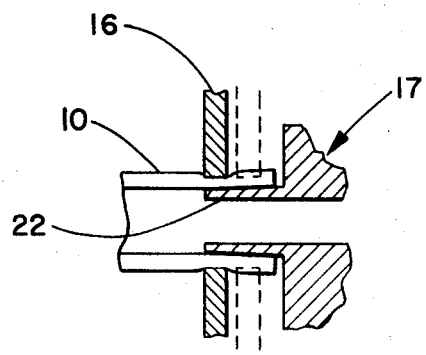
FIGURE 5 is a view like that of FIG. 4 with a variation in the structure.

The structure presented herein as illustrative of this invention is broadly schematically shown in FIG. 1, and the same structure, except for the variations of FIGS. 4 and 5, is the basis of the presentation throughout the drawings. Accordingly, for the most part, like reference numbers are applied to like elements, throughout the drawings.

In FIG. 1, a group of flexible tubes 10 are provided, usually of plastic, and suitable to the fluid being transported, air for example, and suitably flexible according to the needs of the particular application. These tubes are preferably grouped in a harness, indicated by the dotted line 11, and joined to an instrument unit 12, in this case a fluid passage block. The passages indicated generally at 13, within the block 12 are in fact passages, and not flexible tubes, in continuance however of the flexible tubes 10 in the harness 11.

The assembly of the tubes 11 to the block 10 is a separable one but is normally used as a permanent assembly. However, in order to provide ready disassembly of the harnessed tubes from the remainder of the instrumentation, simple assembly and passage joining means is provided on one side of the block 12, for example at 14, opposite the side receiving the flexible tube 10.

Thus, the permanent assembly of the tubes 10 and the block 12 is readily separable joined to another instrument unit 15, without flexible tubes, and with the passages in the block 12 continued as desired.

The tube block assembly particularly lends itself to the joining of a group of tubes to an instrument unit and is adaptable to the assembly of a single tube to a block, where desired.

In the FIG. 1 showing, the fluid tubes and passages are indicated as output, supply, and signal, by way of example passage variants within the block 12 make it possible to have throughput or in-and-out situations for the "output" and "supply" lines, or both. Thus the unit 15 may be cut-off by removal from other parts of the instrumentation, while output and supply lines are maintained to such other parts. This arrangement of passages, and like arrangements, makes possible many other fluid line combinations and situations as desired.

Figure 2:
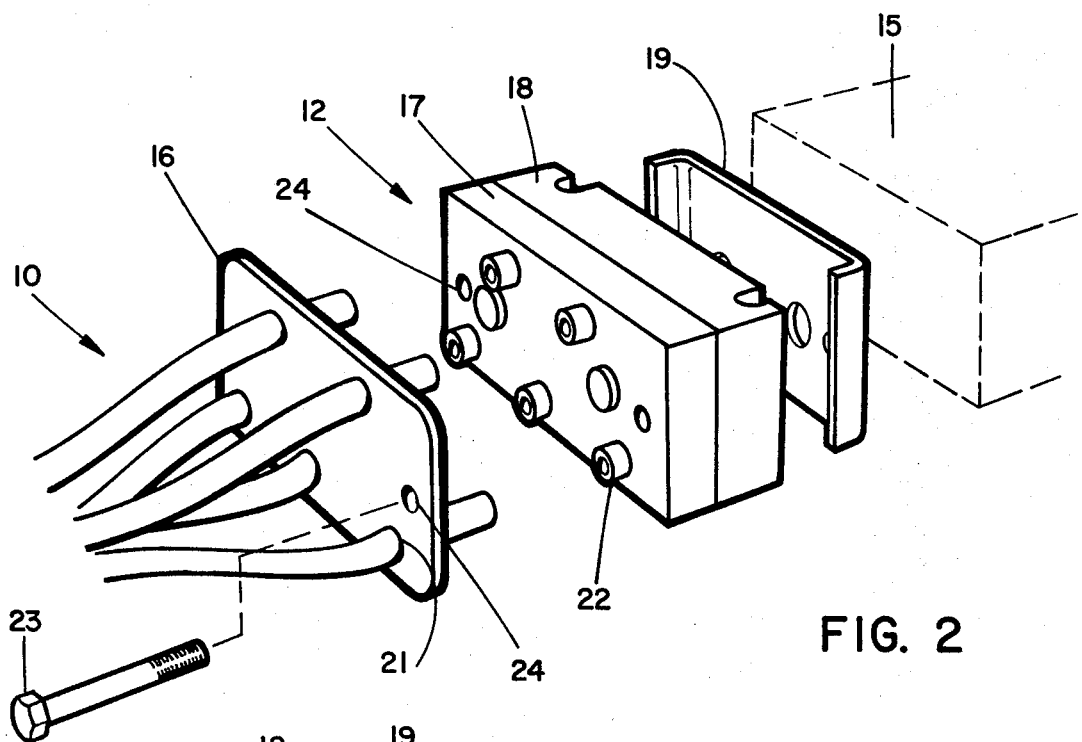
FIG. 2 is a perspective of structure according to this invention, in partial disassembly.

In the structural showings of this invention as in FIG. 2, 3, and elsewhere, a hollow boss is provided on the instrument unit, a flexible tube has its end mounted over the boss, and a cover plate has an opening therein which contains the tube near its end and which also contains the boss within the tube, thus squeezing the tube around the boss in a fluid tight assembly in which the tube wall thickness is reduced.

Figure 3:
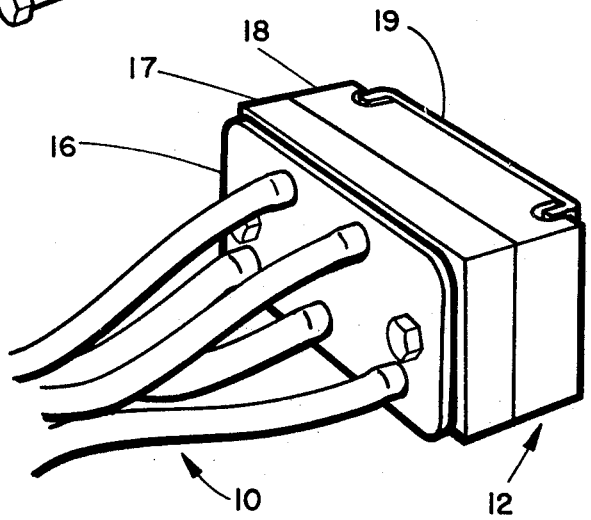
FIG. 3 is a showing of the FIG. 2 structure, as assembled.

As in FIGS. 2 and 3, the assembly structure according to this invention comprised the harness group of flexible tubes 10, cover and tube mounting plate 16, connection top plate 17, connection block 18, and clamp plate 19. FIG. 2 also indicates. In dotted lines, an associated instrument unit 15 which is connectable by suitable simple means (not shown) to the unit 12. Means is provided, in the rear face of the connection block 18 for coupling with the unit 15 directly and without flexible tubes. Accordingly, this invention provides a terminal connection situation for a group of flexible tubes which is separable by simple separation of two solid instrument units, i.e., the assembly 12 and the unit 15.

As in FIGS. 2 and 3, assembly is accomplished by first mounting each of the tubes of the group 10 in a hole, 21, specific to it in the plate 16. The holes are undersize with respect to the outer dimension of the tubes, and the tubes are thus held by constriction in the plate 16 with free ends, protruding therebeyond. As the next step, each of the tube ends is slipped over a boss 22 extended out from the unit cover 17 for this purpose. As in FIGS. 4 and 5, each such boss has a fluid passage therethrough in continuance of its respective tube passage. Also as in FIGS. 4 and 5, each boss is outerly dimensioned to easily receive its respective tube over and around it, without being loose thereon. FIG. 4 shows a straight boss, and FIG. 5 a tapered one for use as desired or necessary.

The next step of assembly is to force the plate 16 towards the cover 17 to a point at which the plate holes which contain the tubes, also contain the bosses within the tubes, providing fluid tight construction connections between the bosses and their respective tubes as the tubes are squeezed by the plate against the bosses.

Figure 6:
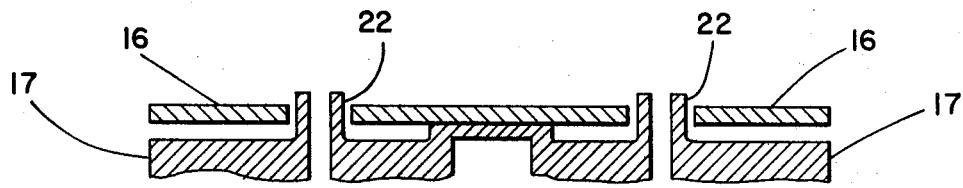
FIG. 6 is an illustration of an assembly detail from the structure of the previous figures.

As in FIG. 6, this movement of the plate 16 may be limited by mesa-like risers on the cover 17, which may in fact be risers or the bosses may have trench grooves around their bases to provide the same effect. This arrangement allows for variations of planned control of the amount of movement to be allowed the plate 16 and consequently to limit the squeezing of the tubes to practical amounts.

The final step of assembly is in placing all the unit parts together; by adding the block 18 and the clamp 19, and securing them all together by means of bolts 23 through bolt holes 24. These are suitably placed and in suitable numbers, in this case, two.

Figures 7, 8:
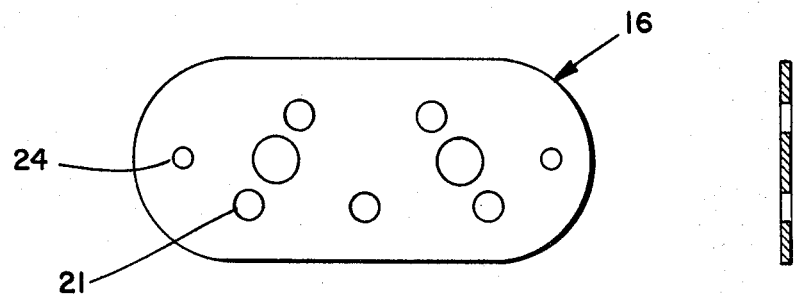
FIGS. 7 and 8 are face and section views of the tube harness plate of the structure of FIGS. 2 and 3.

In the remaining figures of the drawings, examples of structural details are shown. The tube mounting plate 16 in FIGS. 7 and 8; and the cover member 17 shown partly in FIG. 6.

This invention accordingly provides a new and useful fluid passage assembly between flexible tubes, usually in a group, and an instrumentation unit such as the connector passage assembly, in a permanent fashion, while providing for quick and simple disconnect without disturbing tube end connection.

As many embodiments may be made of the above invention, and as changes may be made in the embodiment set forth above without departing from the scope of the invention, it is to be understood that all mater hereinbefore set forth and in the accompanying drawings is to be interpreted as illustrative only and not in a limiting sense.

We claim:
1. For use in fluid instrumentation systems in the exercise of process and energy control, wherein instrument fluids are transported to or from instrumentation units by flexible tube conduits, a connection assembly between a harness group of said flexible tubes and one of said instrumentation units, said assembly comprising an instrumentation unit, fluid passages in said unit, bosses on said unit, a fluid passage through each of said bosses from outside said unit into connection with one of said fluid passages in said unit, a group of flexible tubes each having an end of a size to easily slip over one of said bosses without being loose thereon, an assembly plate, openings in said plate for singly receiving each of the tubings of said group, in a snug fit, and means for securing said plate to said unit, whereby said assembly is accomplished with an end of each tube on and around one respective one of said bosses, with said plate also around said bosses and said tubes and establishing fluidtight fits between said bosses and their respective tubes, and said securing means holding said assembly together, and whereby a continuous, fluidtight passage is provided from each of said tubes, through its respective boss and into one of said passages in said unit, said fluidtight fits between said bosses and their respective tubes being controlled for uniformity and for protection against excessive squeezing of said tubes, for uniformity in that said assembly plate openings for singly receiving each of said tubings are each fully peripheral and fully individual to said tubings so as to apply uniform peripheral pressure by said plate wholly about each of said tubes, and for excessive squeezing in that mesa-like risers are provided on said unit from the same surface as said bosses, with said risers of calculatedly less height than said bosses, whereby said assembly plate is solidly secured to said unit, against the top of said risers to provide sufficient and limited and not excessive sealing of said tubes about said bosses whereby said risers are stop-limit devices against excessive sealing pressure of said assembly plates about and against said flexible tubes.

References Cited
UNITED STATES PATENTS 2,877,028   3/1959   Knight _____ 285—137
3,453,007   7/1969   Roland _____ 285—137

THOMAS F. CALLAGHAN, Primary Examiner

U.S. Cl. X.R.

285—242